Q. A. BRACKETT.
COMBINED TRANSFORMER AND MAINTAINING REACTANCE DEVICE FOR VAPOR CONVERTER SYSTEMS.
APPLICATION FILED AUG. 30, 1916.
1,318,722.
Patented Oct. 14, 1919.
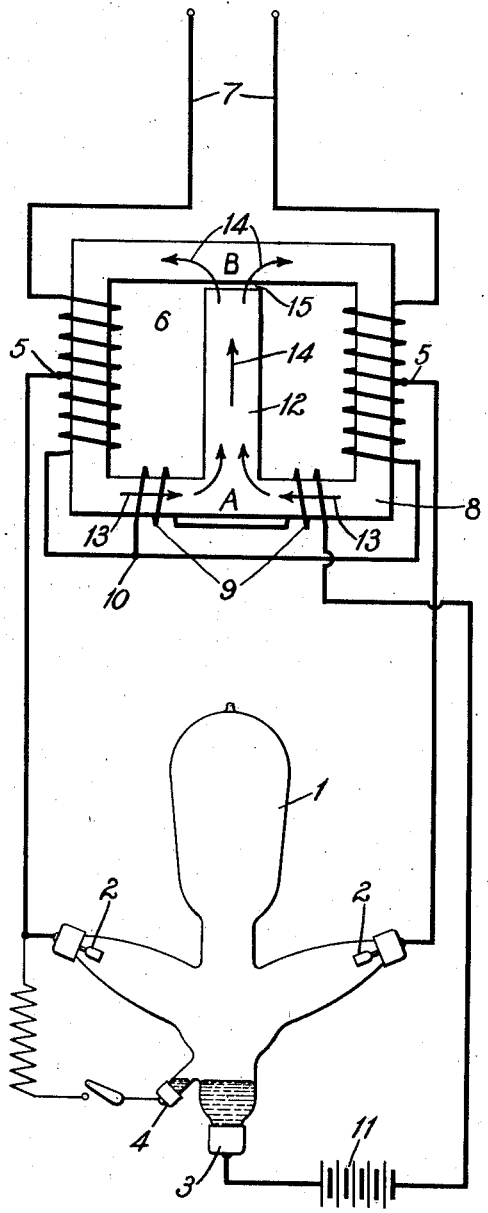
WITNESSES:
R. J. Fitzgerald
O. W. Kennedy
INVENTOR
Quincy A. Brackett.
BY
Wesley G. Carr
ATTORNEY

UNITED STATES PATENT OFFICE.

QUINCY A. BRACKETT, OF PITTSBURGH, PENNSYLVANIA, ASSIGNOR TO WESTINGHOUSE ELECTRIC AND MANUFACTURING COMPANY, A CORPORATION OF PENNSYLVANIA.

COMBINED TRANSFORMER AND MAINTAINING REACTANCE DEVICE FOR VAPOR-CONVERTER SYSTEMS.

1,318,722.

Specification of Letters Patent.  Patented Oct. 14, 1919.

Application filed August 30, 1916. Serial No. 117,633.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Combined Transformers and Maintaining Reactance Devices for Vapor-Converter Systems, of which the following is a specification.

My invention relates to systems wherein alternating current is converted into unidirectional current by vapor converters, and it has for its object to provide a maintaining reactance device that may be conveniently combined with the supply transformer customarily employed in such a system.

In U. S. Patent No. 1,214,116, issued to A. L. Atherton, and assigned to the Westinghouse Electric & Manufacturing Company, is shown and described a vapor converter system in which a winding that is inserted in the cathode lead of the converter is mounted in inductive relation to an auxiliary core member of the supply transformer. During the operation of the converter, the flow of unidirectional current from the cathode through this winding induces a unidirectional flux which passes through the auxiliary core member, thereby providing an effective maintaining reactance device for the converter. In the construction of vapor converting apparatus of small capacity, it has been found expensive and troublesome to provide a separate winding on the auxiliary core member of the transformer, as described in the above-mentioned copending application.

By my invention, I provide a maintaining reactance device for a converter system of the character designated wherein the auxiliary inducing winding is conveniently mounted on the main core member of the transformer.

The single figure of the accompanying drawing is a diagrammatic view of a vapor converter, together with suitable supply, load and starting circuits arranged in accordance with my invention.

Referring to the drawing, a converter 1 of the vapor-arc type is provided with suitable anodes 2, a cathode 3 and an auxiliary starting anode 4. Current is supplied to the main anodes 2—2 from the terminals 5—5 of the secondary winding of an auto-transformer 6, the primary winding of which is energized from suitable alternating-current supply mains 7.

The primary and secondary windings of the transformer are respectively split into halves, the half portions of each winding being mounted on opposite sides of a rectangular core 8 of the transformer 6. The core 8 may be composed of laminations, or it may be in the form of a solid member providing a closed magnetic circuit, preferably rectangular in plan, such, for example, as the base upon which the vapor converter 1 is mounted. One side of the core 8 is provided with an auxiliary winding 9, one terminal of which is connected to the mid-point 10 of the secondary winding of the auto-transformer 6 and the other, through a suitable battery load 11, to the cathode 3. The winding 9 is divided into halves which are oppositely wound on portions of the core 8 that are symmetrically located with respect to a projection or tongue 12 that is provided on the core 8.

Having thus described the arrangement of a system embodying my invention, the operation is as follows: Assume the converter to be started by any suitable means as, for example, by the closure of a circuit to the auxiliary anode 4 and the subsequent tilting of the container. Current will now flow alternately through the two halves of the secondary winding of the supply transformer, thus producing an alternating flux in the core 8 of said transformer. This flux will inductively interlink first with one half of the maintaining winding 13 and then with the other half of said maintaining winding 13. It will be observed, therefore, that, since the two halves of the winding 13 are wound in opposite directions on the core member 8, there will be induced in the cathode lead, of which winding 13 is a portion, a unidirectional current, and the devices 13—13 will, therefore, be instrumental in maintaining the current in the cathode lead in the same direction at all times,

The windings 13—13 may, if desired, be disposed upon the side members or upon the upper member of the transformer core without altering the action thereof.

While I have shown my invention in its preferred form, it will be obvious to those skilled in the art that it is susceptible of various other modifications without departing from the spirit thereof and I desire, therefore, that only such limitations shall be placed thereupon as are imposed by the prior art or as are set forth in the appended claims.

I claim as my invention:

1. The combination with a vapor converter, of a plurality of reactive maintaining devices inserted in the main cathode lead thereof, and inductive means to alternately energize said maintaining devices, whereby they jointly operate to maintain said converter.

2. The combination with a vapor converter provided with $n$ anodes, of $n$ reactive devices connected in the main cathode lead thereof, and inductive means for alternately energizing said reactive devices, whereby said devices operate jointly to maintain said converter.

3. The combination with a vapor converter provided with $n$ anodes, of $n$ reactive devices connected in the main cathode lead thereof, each of said reactive devices being inductively related to the supply circuit of one of said anodes respectively, whereby each of said reactive devices supplies a sustaining impulse immediately after an active period of its associated anode.

4. The combination with a vapor-converter provided with $n$ anodes, of a supply transformer therefor provided with distinct secondary windings for each of said anodes, means in said transformer for segregating a portion of the secondary flux of each of said secondary windings from the remaining windings, and $n$ maintaining windings connected in the cathode lead of said converter, one of said maintaining windings being mounted to interlink with the segregated magnetic flux of each of said secondary windings, respectively, whereby said maintaining windings operate in rotation to supply maintaining impulses to said converter.

5. The combination with a vapor converter, of a supply transformer therefor, the cathode of said converter being connected to substantially the mid-point of the secondary winding of said transformer, whereby the two halves of said secondary winding are alternately active in supplying energy to said converter, and a plurality of maintaining reactance coils for said converter, one of said coils being mounted in inductive relation to each half of said secondary winding.

6. The combination with a vapor converter, of a supply transformer therefor, a connection from the cathode of said converter to substantially the mid-point of the secondary winding of said transformer, whereby the two halves of said secondary winding are alternately active in supplying energy to said converter, an auxiliary core member on said transformer so disposed that it permits secondary working flux from either half of said secondary winding to circulate without traversing the other half thereof, and a plurality of maintaining windings inserted in said connection, one of said maintaining windings being in inductive relation to one half of the transformer secondary winding and another of said maintaining windings being in inductive relation to the other half of said transformer secondary winding.

In testimony whereof, I have hereunto subscribed my name this 24th day of August 1916.

QUINCY A. BRACKETT.